United States Patent
Sondgroth et al.

(10) Patent No.: US 11,827,576 B2
(45) Date of Patent: Nov. 28, 2023

(54) CALCIUM CYANAMIDE FERTILIZER WITH TRIAZONE

(71) Applicant: KB8, Inc., Tarzana, CA (US)

(72) Inventors: Broc Sondgroth, Hollister, CA (US); Eric Berg, Tarzana, CA (US)

(73) Assignee: KB8, Inc., Tarzana, CA (US)

( * ) Notice: Subject to any disclaimer, the term of this patent is extended or adjusted under 35 U.S.C. 154(b) by 340 days.

(21) Appl. No.: 17/196,147

(22) Filed: Mar. 9, 2021

(65) Prior Publication Data

US 2021/0292251 A1    Sep. 23, 2021

Related U.S. Application Data

(60) Provisional application No. 62/991,240, filed on Mar. 18, 2020.

(51) Int. Cl.
| | |
|---|---|
| C05C 9/00 | (2006.01) |
| C05G 3/40 | (2020.01) |
| C05G 5/27 | (2020.01) |
| C05C 7/00 | (2006.01) |
| C05D 1/00 | (2006.01) |

(52) U.S. Cl.
CPC .............. C05C 9/00 (2013.01); C05C 7/00 (2013.01); C05D 1/00 (2013.01); C05G 3/40 (2020.02); C05G 5/27 (2020.02)

(58) Field of Classification Search
CPC .... C05C 9/00; C05C 7/00; C05C 9/02; C05D 1/00; C05G 3/40; C05G 5/27; C05G 3/80; C05G 5/20; C05F 11/00
See application file for complete search history.

(56) References Cited

U.S. PATENT DOCUMENTS

2020/0223763 A1*   7/2020   Forostoski ................ C05C 9/00

FOREIGN PATENT DOCUMENTS

| DE | 1592815 A | 6/1970 |
|---|---|---|
| EP | 3575278 A | 12/2019 |
| WO | 2017044774 A1 | 3/2017 |
| WO | WO-2021228919 A1 * | 11/2021 |

OTHER PUBLICATIONS

Bhattacharya, A. "Effect of high-temperature stress on the metabolism of plant growth regulators." Effect of high temperature on crop productivity and metabolism of macro molecules (2019): 485-591. (Year: 2019).*
EP21163472.0 Search Report.

* cited by examiner

*Primary Examiner* — Jennifer A Smith
(74) *Attorney, Agent, or Firm* — Fulwider Patton LLP

(57) ABSTRACT

The present invention is a liquid fertilizer comprising a calcium cyanamide component that is dissolved, co-applied, dispersed, or suspended in a solution of aqueous triazone urea. The combination of calcium cyanamide and triazone urea produces a slow release of nitrogen that requires fewer reapplications and is more effective than heretofore fertilizers. In one preferred embodiment, the fertilizer or plant treatment is further combined with a soil treatment including polycarboxylate acids and polyaliphatic acid salts in combination with potash to further enhance the properties of the fertilizer.

3 Claims, No Drawings

CALCIUM CYANAMIDE FERTILIZER WITH TRIAZONE

CROSS-REFERENCES TO RELATED APPLICATIONS

This application claims priority to U.S. Provisional Patent Application No. 62/991,240, filed Mar. 18, 2020, the content of which is incorporated by reference herein in its entirety.

BACKGROUND

Healthy plants often contain 3 to 4 percent nitrogen in their above-ground tissues. This is a much higher concentration compared to other nutrients. Carbon, hydrogen and oxygen, nutrients that don't play a significant role in most soil fertility management programs, are the only other nutrients present in higher concentrations. Nitrogen is so vital because it is a major component of chlorophyll, the compound by which plants use sunlight energy to produce sugars from water and carbon dioxide (i.e., photosynthesis). It is also a major component of amino acids, the building blocks of proteins. Without proteins, plants wither and die. Some proteins act as structural units in plant cells while others act as enzymes, making possible many of the biochemical reactions on which life is based. Nitrogen is a component of energy-transfer compounds, such as ATP (adenosine triphosphate). ATP allows cells to conserve and use the energy released in metabolism. Nitrogen is also a significant component of nucleic acids such as DNA, the genetic material that allows cells (and eventually whole plants) to grow and reproduce.

Most plants use two main sources of nitrogen. Stored nitrogen is nitrogen that has accumulated in the plant during the previous year. Depending on the plant species, this nitrogen is stored in roots, stems, and/or leaves. The amount available for growth depends on growing conditions during the previous year. Factors that influence nitrogen storage include nitrogen availability and losses of roots, stems (possibly due to handling, cold storage, pruning, and transplanting, etc., or environmental factors such as temperature or moisture). The other source is nitrogen uptake, which is nitrogen that is taken up by roots or leaves during a current growing season. The rate of nitrogen uptake depends on nitrogen availability in soil and media and the physiological capacity of roots and leaves to acquire nitrogen. Factors that influence the capacity of roots to take up nitrogen include temperature, moisture, soil texture and the plant developmental stage. Factors that influence the capacity of leaves to absorb nitrogen include plant species, plant age, leaf age, temperature and humidity. Leaves of some species have physical and chemical characteristics that allow them to absorb nitrogen better than others.

Nitrogen availability affects plant growth and development and is intimately linked to the quality of nursery plants. In nursery production, nitrogen is commonly applied to soils and container media as controlled-release and/or liquid fertilizers. Foliar fertilization means applying nutrients to plant leaves or needles. Foliar nitrogen fertilization during nursery production can correct nitrogen deficiencies, decrease the amount of total nitrogen necessary (saving nurseries money) and minimize nitrogen runoff. However, foliar urea absorption is affected by external factors such as temperature and moisture. High leaf surface moisture followed by drying during urea application can cause nitrogen losses from ammonia volatilization. Application effectiveness can be decreased by runoff from leaf surfaces, rain and overhead irrigation, and rapid drying of spray solutions on leaves. How much can be applied depends on how much the foliage can tolerate without exhibiting urea toxicity. Sensitivity to urea varies with species and leaf age.

Accordingly, foliar nitrogen application alone is less efficient due to volatilization and the loss of efficacy, and it becomes necessary to also utilize soil treatments to supply the plants with enough nitrogen to flourish. Applying too high a concentration of nitrogen in the soil can cause the soil treatment to leach out or descend below the root level, especially where crops require a lot of irrigation to grow or in the presence of heavy rains. Another issue that arises is the non-uniform disbursement of soil treatments, especially with solid fertilizers. This can lead to an excess concentration in some areas and a deficient concentration in others, causing inconsistent or sporadic plant growth. Ensuring even application of the soil treatment is difficult with current soil treatments.

Gypsum is commonly used as a soil conditioner to help loosen compacted soil, promote root development, chelate minerals and allow uptake of Nitrogen and Phosphorous without affecting the soil's pH. However, gypsum can leave a high level of calcium sulfate in the soil and the resulting soil is often left too hard for optimal growing conditions, requiring even further soil treatment. Gypsum also impacts biologicals and bacterium advantageous to plant growth. To avoid the shortcomings of gypsum, cyanmide was promoted to replace gypsum as a source of nitrogen since there is minimal salt buildup and cyanamide is a source of carbon used by the aforementioned bacterium.

A variety of techniques have been employed to deliver nutrients to growing plants and to extend or delay release of nutrients from the fertilizers. Conventional rapid-release fertilizers generally provide nutrients in the form of water-soluble salts. As a result, nutrients are rapidly available to plants, but also, in some instances, are rapidly leached out of the root zone into ground and surface waters. This loss of nutrients is an economic concern to the grower as well as an environmental concern to communities and ecosystems located downstream who rely on clean sources of water. To minimize nutrient losses, conventional fertilizers are typically applied in small doses multiple times during a typical growing season. Alternatively, controlled-release fertilizers, which employ various methods to slow the release of the water-soluble form of the nutrient, can be applied in a single large application, but these fertilizers are significantly more expensive than conventional fertilizers.

The dominant form of conventional nitrogen fertilizer is urea; other common forms include anhydrous ammonia, ammonium sulfate, and ammonium nitrate. These compounds either contain or release ammonium ions, which are readily retained by soils. However, soil microbial activity converts ammonium to nitrate, which is not retained by soils and thus easily lost by leaching processes. Nitrogen can also be lost from soils by volatilization of ammonia gas under high pH conditions, and by denitrification processes that yield dinitrogen, nitric oxide, and nitrous oxide gases, the latter of which is a powerful greenhouse gas. The loss of the nitrogen forces plant growers to reapply the fertilizer more frequently, which is costly and can damage the plants. Thus, there are many reasons, both economic and environmental, to improve the efficiency of nitrogen usage in agriculture.

Nitrogen in form of urea has several advantages for quick release and visual crop response. Unfortunately, the effects are quickly diminished if timing for plant uptake is not correct as well as soil moisture and microbial activity present. Urea volatizes and dissipates into the air, leading to waste. Moreover, if the soil is flooded or improper irrigation pockets develop the urea is converted into a non-available form to plants.

The present invention serves to produce an effective and efficient fertilizer that overcomes many of the drawbacks of the current products on the market.

SUMMARY OF THE INVENTION

The present invention is a fertilizer that has a calcium cyanamide component that is dissolved, co-applied, dispersed, or suspended in a solution of aqueous triazone urea. The combination of calcium cyanamide and triazone urea produces a slow release of nitrogen that requires fewer reapplications and is more effective than heretofore fertilizers. The composition is more stable and lasts longer than existing products and thus stays in the vicinity of the plant root longer without premature dissipation or noneffective release. This also leads to reduced leaching and healthier plants. In one preferred embodiment, the fertilizer or plant treatment is further combined with a soil treatment including polycarboxylate acids and polyaliphatic acid salts in combination with potash to further enhance the properties of the fertilizer.

The present invention is a multifunctional fertilize that demonstrates improved nitrogen stabilization. The calcium cyanamide acts as a catalyst and stabilizes the triazone into a form that has multiple releases of predictable timing. This composition also diminishes leaching, a common occurrence when using cyanamide. The present invention promotes a greater chance for microbes to develop near the root zone to enable nitrogen uptake and general plant health. The fertilizer of the present invention also stabilizes the water table which helps with drainage and uniform dispersion due in part to the soil treatment additive that helps nitrogen levels stabilize and prevents high and low points. This plant growth composition demonstrates strong chelation properties to help with salts by collecting or coalescing the salt particles into larger portions and flushing the salt below the rootzone, and promoting dissolution of some salts. A fertilizer of the present invention also addresses the problem of residual metals that can interfere with nitrogen availability throughout its release period.

DETAILED DESCRIPTION OF THE PREFERRED EMBODIMENTS

Urea-triazone nitrogen is a stable solution resulting from a controlled reaction in aqueous medium of urea, formaldehyde, and ammonia which contains at least 25% total nitrogen. This nitrogen source contains no more than 40%, nor less than 5%, of total nitrogen from unreacted urea and not less than 40% from triazone. All other nitrogen shall be derived from water-soluble dissolved reaction products of the above reactants. It is a source of slowly released nitrogen that is a safer and more effective material for direct application on plant foliage. In an experimental trial, tomato plant growth was enhanced with foliar application of urea-triazone relative to that obtained from ammonium nitrate or urea. The stability of this nitrogen source from potential losses via ammonia volatilization and nitrate leaching when soil applied was also verified by the results of the experimental field trials.

Calcium Cyanamide is a chemical compound that has previously been used in industrial agricultural fertilizers to help plants reach high yields, thus maximizing profits for farmers. The substance is typically applied directly to the soil, where it breaks down into ingredients that are beneficial to plan growth. Calcium cyanamide also functions in other facets in addition to being a fertilizer. Calcium cyanamide's primary function is that of a fertilizer in industrial agriculture settings. The chemical enriches the soil with beneficial lime and, upon coming into contact with water, begins to break down, releasing nitrogen into the soil by way of ammonia. In addition to acting as a fertilizer, the chemical also functions as an effective pesticide and fungicide by killing insects, soil parasites and harmful fungi. The chemical works as an defoliant and herbicide by preventing weed germination as well.

The present invention combines aqueous triazone with solid calcium cyanamide to yield a liquid fertilizer that can be added directly to the soil for slow release of available nitrogen. Potash, an impure combination of potassium carbonate and potassium salt, can be added to the triazone/calcium cyanamide composition in a preferred embodiment to produce an even more stable and effective liquid fertilizer.

In one preferred embodiment, the calcium cyanamide makes up between 1-25% by weight in the triazone urea solution. Beginning with between 5 and 60 gallons of triazone, calcium cyanamide is added in the range of 0.5 pound to 30 pounds and mixed thoroughly through agitation or other mechanical mixing. This fertilizer can be supplemented with approximately one gallon of potash per acre.

The composition can further be enhanced by incorporating certain plant growth regulators to improve functionality. One such plant growth regulator is IBA Indole-3-butyric Acid (IBA) CAS 133-32-4. This as well as other plant growth hormones (NAA, 6ba, CPPU) increase the effectiveness of the fertilizer and adds efficacy to the triazone and cyanamide as a starter fertilizer. Additionally, adding carbon (granular or powder) or having the option to add more carbon-based sources such as biochar can enhance the efficacy. Currently cyanamide has graphite as a source however there is a pressing issue in agriculture to add biochar and other carbon based elements back into soil during fertilizer application.

We claim:

1. A nitrogen releasing liquid fertilizer, comprising:
aqueous triazone urea solution;
solid calcium cyanamide; and
potash:
wherein the solid calcium cyanamide makes up between 1-25% by weight in the triazone urea solution.

2. The nitrogen releasing liquid fertilizer of claim 1, further comprising a soil treatment including polycarboxylate acids.

3. The nitrogen releasing liquid fertilizer of claim 1, further comprising polyaliphatic acid salts.

* * * * *